United States Patent [19]

Hefner, Jr.

[11] Patent Number: 4,707,533
[45] Date of Patent: Nov. 17, 1987

[54] VINYL ESTER OF POLYEPOXIDE OF POLYPHENOL CYANATE MIXTURE AND POLYMALEIMIDE CO-OLIGOMER

[75] Inventor: Robert E. Hefner, Jr., Lake Jackson, Tex.

[73] Assignee: The Dow Chemical Company, Midland, Mich.

[21] Appl. No.: 939,384

[22] Filed: Dec. 8, 1986

Related U.S. Application Data

[62] Division of Ser. No. 831,958, Feb. 24, 1986, Pat. No. 4,661,553.

[51] Int. Cl.$^4$ .............................................. C08G 59/02
[52] U.S. Cl. ......................................... 528/96; 528/98; 528/99; 528/101; 528/103; 528/104; 528/170; 528/322; 528/321
[58] Field of Search ..................... 528/96, 98, 99, 101, 528/103, 104, 170, 321, 322

[56] References Cited

U.S. PATENT DOCUMENTS 4,661,553  4/1987  Hefner .................................. 525/419

Primary Examiner—Harold D. Anderson

[57] ABSTRACT

Vinyl ester resins are prepared by reacting a polyepoxide of a co-oligomerization product of a mixed cyanate of a polyphenol and a polymaleimide with a monounsaturated monocarboxylic acid.

13 Claims, No Drawings

VINYL ESTER OF POLYEPOXIDE OF POLYPHENOL CYANATE MIXTURE AND POLYMALEIMIDE CO-OLIGOMER

CROSS-REFERENCE TO RELATED APPLICATION

This is a division of application Ser. No. 831,958 filed Feb. 24, 1986, now U.S. Pat. No. 4,661,553.

BACKGROUND OF THE INVENTION

The present invention provides novel vinyl ester resins prepared from epoxy resins of the co-oligomerization product of a polyphenol cyanate mixture and a polymaleimide, as well as cured compositions prepared from said vinyl ester resins.

Vinyl esters are the reaction product of about equivalent amounts of a monounsaturated monocarboxylic acid and a polyepoxide. One class of vinyl esters is described by Bearden in U.S. Pat. No. 3,367,992 where dicarboxylic acid half esters of hydroxyalkyl acrylates or methacrylates are reacted with polyepoxide resins. Bowen in U.S. Pat. Nos. 3,066,112 and 3,179,623 describes the preparation of vinyl esters from monocarboxylic acids such as acrylic and methacrylic acid. Bowen also describes alternate methods of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al describes vinyl esters where the molecular weight of the polyepoxide is increased by reacting a dicarboxylic acid with the polyepoxide resin as well as acrylic acid, etc. in U.S. Pat. No. 3,256,226. Other functional compounds containing a group which is reactive with an epoxide group, such as an amine, mercaptan and the like, may be utilized in place of the dicarboxylic acid. All of the above-described compositions, which contain the characteristic linkages

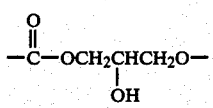

and terminal polymerizable vinylidene groups are classified as vinyl esters and are incorporated herein by reference.

The vinyl ester is typically combined with a reactive diluent, a copolymerizable vinyl monomer, to alter the viscosity of the mixture, to vary the properties of the cured coating, or for other known reasons. Most any vinyl monomer may be employed which is copolymerizable with the unsaturated groups of the vinyl ester. Such monomers include both monovinyl and polyvinyl monomers. Typical monomers include the alkenyl aromatic monomers such as styrene, α-methylstyrene, vinyltoluene, t-butyl styrene and the like; and alkyl and hydroxyalkyl esters of acrylic and methacrylic acid such as methyl, ethyl, propyl, butyl, cyclohexyl and hydroxyethyl, hydroxypropyl and hydroxybutyl acrylates and methacrylates. In addition to the above, other monomers are especially useful for ultra-violet light curable systems such as 2-acetoxyalkyl acrylates; pentaerythritol di-, tri- or tetra-acrylates and the like and may be added in any order.

The vinyl ester and copolymerizable vinyl monomer blend is a crosslinkable vinyl ester resin which is cured by mixing in a free radical forming catalyst in an amount ranging from 0.1 to about 5 percent by weight, preferably 1 to 2 percent by weight. Examples of these catalysts are benzoyl peroxide, tertiary butyl hydroperoxide, methylethylketone peroxide and the like. It is frequently of value to add an accelerator such as N,N-dimethylaniline, cobalt naphthenate and the like.

Preparation of vinyl ester resins containing triazine or both triazine and oxazoline groups is taught by Hefner, Jr. in U.S. Pat. No. 4,515,934. The compositions described therein are prepared by reacting (a) a polyepoxide containing triazine groups, or (b) a polyepoxide containing both triazine and oxazoline groups, or (c) a mixture of (a) and (b) above with (d) from about 0.75 to about 1, preferably from about 0.9 to about 1, mole of a monounsaturated monocarboxylic acid or mixture of monounsaturated monocarboxylic acids per epoxide group in the presence of (e) a suitable quantity of a suitable catalyst. The resultant vinyl esters are used to prepare curable (copolymerizable) vinyl ester and vinyl monomer formulations.

Preparation of vinyl ester resins of polyepoxides containing triazine groups and iminocarbamate linkages is taught by Hefner, Jr. in U.S. Pat. No. 4,555,554. The compositions described therein are prepared by reacting (a) a polyepoxide containing at least one triazine group and at least one iminocarbamate linkage with (b) from about 0.75 to about 1.2, preferably from about 0.9 to about 1, mole of a monounsaturated monocarboxylic acid or mixture of monounsaturated monocarboxylic acids per epoxide group in the presence of (c) a suitable quantity of a suitable catalyst. The resultant vinyl esters are used to prepare curable (copolymerizable) vinyl ester and vinyl monomer formulations.

The vinyl ester compositions of the present invention are derived by reaction of an epoxy resin of the co-oligomerization product of a polyphenol cyanate mixture and a polymaleimide with a monounsaturated monocarboxylic acid. The invention consists of the vinyl esters and the vinyl ester and copolymerizable vinyl monomer formulations, whether or not cured. The vinyl ester resin compositions of this invention possess improved mechanical properties, especially tensile and flexural strength, percent elongation and flexural modulus.

SUMMARY OF THE INVENTION

The present invention pertains to vinyl ester compositions prepared by reacting (A) at least one polyepoxide of a co-oligomerization product of a mixed cyanate of a polyphenol and a polymaleimide with (B) from about 0.75 to about 1.2, preferably from about 0.9 to about 1, mole of a monounsaturated monocarboxylic acid or mixture of monounsaturated monocarboxylic acids per epoxide group; in the presence of (C) a catalytic quantity of a suitable catalyst.

Component (A) is obtained either by epoxidation of the co-oligomerization product of a mixed cyanate of a polyphenol and a polymaleimide or by advancement reaction of a polyepoxide represented by formulas XII, XIII, XIV, XV or a mixture thereof with the co-oligomerization product of a mixed cyanate of a polyphenol and a polymaleimide.

Another aspect of the present invention pertains to compositions comprising from about 1 to about 99, preferably from about 30 to about 70 percent by weight of the aforementioned vinyl ester and from about 99 to about 1, preferably from about 70 to about 30 percent by weight of at least one copolymerizable ethylenically unsaturated monomer.

Another aspect of the present invention pertains to compositions comprising a mixture of vinyl esters comprising (A) from about 1 to about 99, preferably from about 5 to about 50 percent by weight of the aforementioned vinyl ester compositions and (B) from about 99 to about 1, preferably from about 95 to about 50 percent by weight of a vinyl ester composition resulting from reacting an epoxy resin represented by formulas XII, XIII, XIV, XV or a mixture of such epoxy resins and at least one monounsaturated monocarboxylic acid.

Another aspect of the present invention concerns a composition comprising (I) from about 1 to about 99 percent by weight, preferably from about 30 to about 70 percent by weight of the above mixture of vinyl esters and (II) from about 99 to about 1, preferably from about 70 to about 30 percent by weight of at least one copolymerizable ethylenically unsaturated monomer.

A further aspect of the present invention pertains to the product resulting from curing the aforementioned vinyl esters or vinyl ester and copolymerizable ethylenically unsaturated monomer formulations.

DETAILED DESCRIPTION OF THE INVENTION

The cyanate mixture used in the present invention is prepared by reacting at least one material having an average of more than one aromatic hydroxyl group per molecule with at least 0.01 but not more than 0.95, preferably from about 0 05 to about 0.55 mole of cyanogen halide or mixture of cyanogen halides per aromatic hydroxyl group in the presence of a suitable base in a quantity of from about 0.01 to about 1.1, preferably from about 0.05 to about 0.6 mole per aromatic hydroxyl group at a temperature and time sufficient to essentially complete the reaction and thereafter recovering the resultant cyanate mixture.

Suitable materials having an average of more than one aromatic hydroxyl group per molecule which can be employed to prepare the cyanate mixture precursor to the co-oligomerization product of a mixed cyanate of a polyphenol and a polymaleimide include, for example, those represented by the formulas:

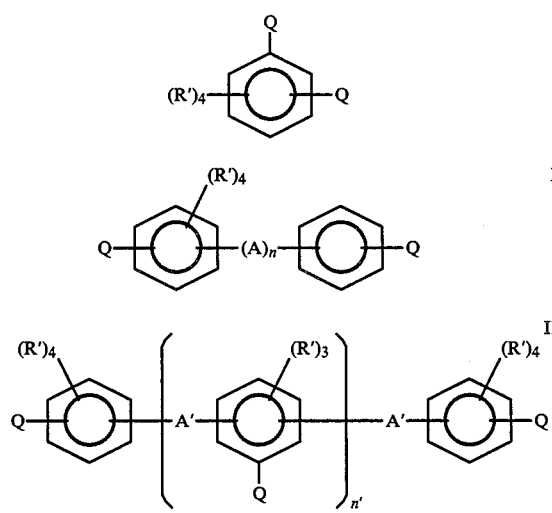

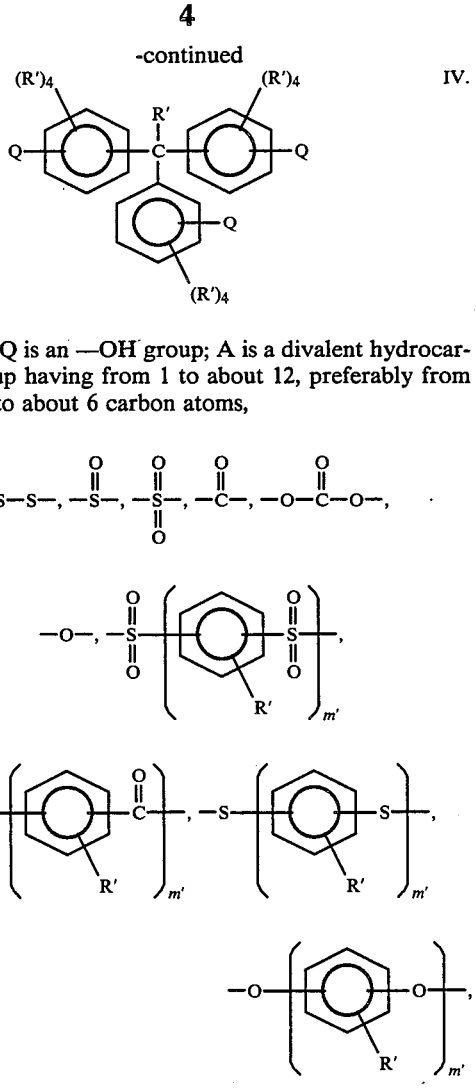

wherein Q is an —OH group; A is a divalent hydrocarbon group having from 1 to about 12, preferably from about 1 to about 6 carbon atoms, $$-S-, -S-S-, -\underset{O}{\overset{O}{\underset{\|}{S}}}-, -\underset{\|}{\overset{O}{S}}-, -\overset{O}{\underset{\|}{C}}-, -O-\overset{O}{\underset{\|}{C}}-O-,$$

and the like; each A' is a divalent hydrocarbon group having from 1 to about 3, preferably 1, carbon atoms or a

group; p has a value of from zero to about 10, preferably from zero to 3; each each R' is independently hydrogen or a hydrocarbyl or hydrocarbyloxy group having from 1 to about 6 carbon atoms or a halogen, preferably chlorine or bromine; m' has a value from 1 to about 100, preferably from 1 to about 10; n has a value of zero or 1 and n' has a value from about 0.001 to about 6.

Particularly suitable aromatic hydroxyl-containing compounds include, for example, o-, m- and p-dihydroxybenzene, 2-tert-butyl hydroquinone, 2,4-dimethyl resorcinol, 2,5-di-tert-butyl hydroquinone, tetramethyl hydroquinone, 2,4,6-trimethyl resorcinol, 4-chlororesorcinol, 4-tert butyl pyrocatechol, 1,1-bis(4-hydroxyphenyl)ethane; 2,2-bis(4-hydroxyphenyl)propane; 2,2-bis(4-hydroxyphenyl)pentane; bis(4,4'-dihydroxyphenyl)methane; 4,4'-dihydroxydipheny, 2,2'dihydroxylphenyl, 3,3', 5,5'-tetramethyl-4,4'-dihydroxydiphenyl, 3,3',5,5'-tetrachloro-4,4'-dihydroxydiphenyl, 3,3',5,5'-tetrachloro-2,2'-dihydroxydiphenyl, 2,2',6,6'-tetrachloro-4,4'-dihydroxydiphenyl, 4,4'-bis((3-hydroxy)phenoxy)-diphenyl, 4,4'-bis((4-hydroxy)-phenoxy)-diphenyl, 2,2'-dihydroxy-1,1'ether, 3,3',5,5'-tetramethyl-4,4'-dihydroxydiphenyl ether, 3,3',5,5'-tetrachloro-4,4'-hydroxydiphenyl ether, 4,4'-bis(p-hydroxyphenoxy)-diphenyl ether, 4,4'-bis(p-hydroxyphenyl isopropyl)-diphenyl ether, 4,4'-bis(p-hydroxyphenoxy)-benzene, 4,4'-bis(p-hydroxyphenoxy)-diphenyl ether, 4,4'-bis(4(4-hydroxyphen sulfone)-diphenyl ether, and other dihydroxydiphenyl ethers; 4,4'-dihydroxydiphenyl sulfone, 3,3',5,5'-tetramethyl-4,4'-dihydroxydiphenyl sulfone, 3,3'5,5'-tetrachloro-4,4'-dihydroxydiphenyl sulfone, o 4,4'-bis(p-hydroxyphenyl isopropyl)-diphenyl sulfone, 4,4'-bis((4-hydroxy)phenoxy)-diphenyl sulfone, 4,4'-bis((3-hydroxy)phenoxy)-diphenyl sulfone, 4,4'-bis(4-(4-hydroxyphenyl-isopropyl)-phenoxy)-diphenyl sulfone, 4,4'-bis(4(4-hydroxy)diphenoxy)-diphenyl sulfone, and other diphenyl sulfones; 4,4'-dihydroxydiphenyl methane, 4,4'-bis(p-hydroxyphenyl)-diphenyl methane, 2,2'-bis(p-hydroxyphenyl)-propane, 3,3',5,5'-tetramethyl-2,2'-bis(p-hydroxyphenyl)-propane, 3,3',5,5,'-tetrachloro-2,2'-bis(p-hydroxyphenyl)propane, 1,1-bis(p-hydroxyphenyl)-cyclohexane, bis-(2-hydroxy-1-naphthyl)-methane, 1,2-bis(p-hydroxyphenyl)-1,1,2,2-tetramethyl ethane, 4,4'-dihydroxybenzophenone, 4,4'-bis((4-hydroxy)phenoxy)-benzophenone, 1,4-bis(p-hydroxyphenyl isopropyl)-benzene, phloroglucinol, pyrogallol, 2,2',5,5'-tetrahydroxy-diphenyl sulfone, other dihydroxydiphenyl alkanes, tris(hydroxyphenyl)methane, tris(4-hydroxy-2-bromophenyl)methane, other tris(hydroxyphenyl)alkanes, mixtures thereof and the like.

Suitable cyanogen halides which can be employed to prepare the cyanate mixture precursor include, for example, cyanogen chloride, cyanogen bromide, mixtures thereof and the like.

If desired, the method reported in *Organic Synthesis*, Vol. 61, page 35–67 (1983), published by John Wiley & Sons, may be used to generate the required amount of cyanogen halide in situ, although this is less preferred than using neat cyanogen halide.

Suitable base materials which can be employed to prepare the cyanate mixture precursor include both inorganic bases such as alkali metal hydroxides and tertiary amines, such as, for example, sodium hydroxide, potassium hydroxide, triethylamine, pyridine, lutidine, mixtures thereof and the like. The tertiary amines are most preferred as the base material.

Reaction to provide the cyanate mixture is usually conducted at a temperature of from about −40° C. to about 60° C., preferably from about −20° C. to about 25° C. for from about 10 minutes (600 s) to about 120 minutes (7200 s), preferably from about 10 minutes (600 s) to about 60 minutes (3600 s).

If desired, the reaction to provide the cyanate mixture can be conducted in the presence of an inert solvent reaction medium. Suitable such solvents include, for example, water, chlorinated hydrocarbons, ketones, mixtures thereof and the like. Most preferred solvents include acetone and methylene chloride.

Suitable polymaleimides which can be employed herein include, for example, those represented by the formulas

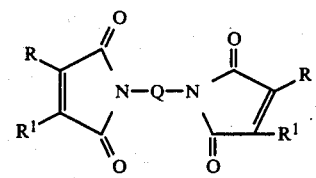

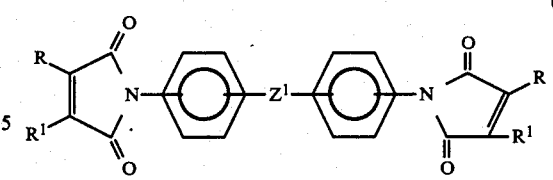

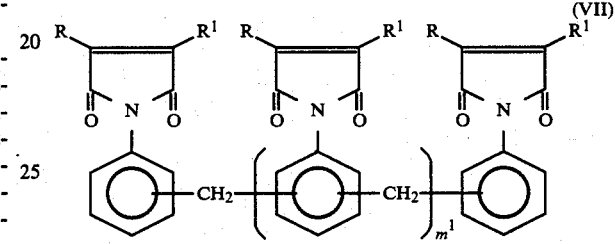

wherein $Z^1$ is independently a direct bond, an alkylene group having from 1 to about 5 carbon atoms,

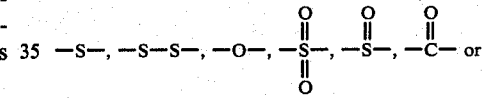

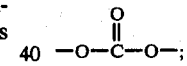

each R and $R^1$ is independently hydrogen or a hydrocarbyl group having from 1 to about 3 carbon atoms; Q is a divalent alkyl radical having 2 to about 12 carbon atoms and $m^1$ has a value of 0.01 to about 10.

Typical polymaleimides represented by formulas V, VI, and VII include, N,N'-ethylenebismaleimide, N,N'-ethylenebis(2-methylmaleimide), N,N'-hexamethylenemaleimide, N,N'-(oxydi-p-phenylene)bismaleimide, N,N'-(methylenedi-p-phenylene)bismaleimide, N,N'-(methylenedi -p-phenylene)bis(2-methylmaleimide), N,N'-(thiodi-p-phenylene) bismaleimide, N,N'-(sulfonyldi-m-phenylene)bismaleimide, N,N'-(isopropylidenedi-p-phenylene)bismaleimide, polymethylene polyphenylene polymaleimides and the like. The polymaleimides may be used either alone or in any combination.

The polymaleimides can be prepared by reacting a stoichiometric quantity of a maleic anhydride per amine group of a polyamine in the presence of a suitable solvent.

Suitable maleic anhydrides include, for example, those represented by the formula

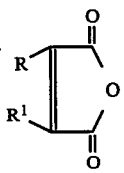
(VIII)

wherein R and R¹ are as hereinbefore defined.

Suitable maleic anhydrides include maleic anhydride, methyl maleic anhydride, mixtures thereof and the like. Most preferred as the maleic anhydride is maleic anhydride, per se.

Suitable polyamines which can be employed to prepare the polymaleimides include, for example, those represented by the formulas

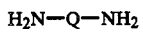
(IX)

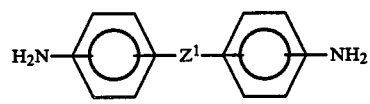
(X)

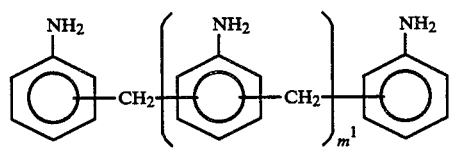
(XI)

wherein Q, Z¹ and m¹ are as hereinbefore defined.

Suitable polyamines include 1,4-diaminobutane, dodecyl diamine, 1,6-hexane diamine, 2-methyl-4-ethyl-1,8-diaminooctane, methylene dianiline, diaminodiphenyl ether, aniline-formaldehyde condensation products, mixtures thereof and the like.

Suitable solvents include aromatic hydrocarbons, chlorinated hydrocarbons, N,N-dimethylformamide and the like. Most preferred solvents are N,N-dimethylformamide, chloroform and toluene. The polymaleamic acid resulting from reaction of a maleic anhydride and a polyamine may be isolated then dehydrated to the desired polymaleimide. Alternately, the reaction may be performed in a single continuous step. Detailed procedure for preparing polymaleimides can be found in U.S. Pat. No. 2,462,835 and 2,444,536.

Suitable co-oligomerization catalysts which can optionally although most preferably be employed for co-oligomerization of the cyanate mixture and polymaleimide include, for example, metal salts of carboxylic acids, such as, for example, lead octoate, zinc stearate, zinc acetylacetonate, usually at concentrations of about 0.001 to about 5 percent. Most preferred catalysts are cobalt naphthenate and cobalt octoate, mixtures thereof and the like.

The co-oligomerization reaction is usually conducted at a temperature of from about 70° C. to about 250° C., preferably from about 70° C. to about 200° C. for a period of from about 30 minutes (1800 s) to about 240 minutes (14,400 s), preferably from about 60 minutes (3600 s) to about 120 minutes (7200 s). The co-oligomerization reaction is preferably performed in the presence of the aforementioned catalyst(s).

The cyanate mixture and polymaleimide are thoroughly blended to provide a homogeneous mixture prior to co-oligomerization reaction. This is accomplished either by grinding or blending the solid cyanate mixture and polymaleimide or, preferably, by dispersing or dissolving or slurring said polymaleimide in a molten solution of cyanate mixture.

Oligomers are prepared from co-oligomerization of the mixed cyanate of a polyphenol and a polymaleimide using mole ratios of maleimide groups to cyanate groups of about 0.01:1 to about 1:1, preferably 0.025:1 to about 0.1:1.

Co-oligomerization of the cyanate mixture with a polymaleimide can lead to a complex variety of structures including the cyanate group homopolymerization structure (triazine)

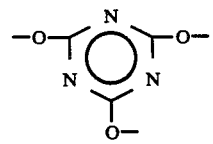

the maleimide group homopolymerization structure

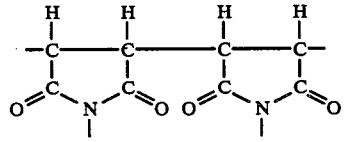

and cyanate group and maleimide group copolymerization structures such as, for example,

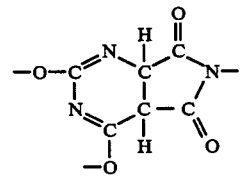

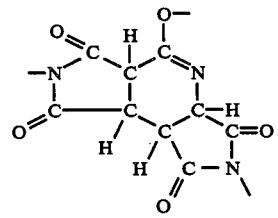

The terms homopolymerization and copolymerization are also meant to include both dimerization and oligomerization. Minor amounts of other co-oligomerization structures may also be formed, such as, for example, the phenolic hydroxyl addition product to the maleimide unsaturation:

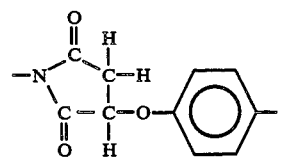

Epoxidation of the co-oligomerization product can be performed by the known methods described in *Handbook of Epoxy Resins* by Lee and Neville, McGraw-Hill (1967) which is incorporated herein by reference. This usually includes reacting the co-oligomerization product (step II) with an epihalohydrin followed by dehydrohalogenation with a basic-acting material such as an alkali metal hydroxide and finally recovering the resultant glycidyl ether product.

Suitable epoxy resins for advancement reaction with the co-oligomerization product of a mixed cyanate of a polyphenol and a polymaleimide include, for example, those represented by the formulas:

has a value from zero to about 40, preferably from 0.1 to about 5.

The advancement reaction is optionally, although preferably, performed in the presence of 0.01 to about 2.0 percent by weight of a suitable catalyst. Suitable catalysts include bases, basic acting materials, acids and the like. Preferred catalysts are the quaternary ammonium salts and phosphonium salts. A most preferred catalyst is benzyltrimethylammonium chloride. Reac-

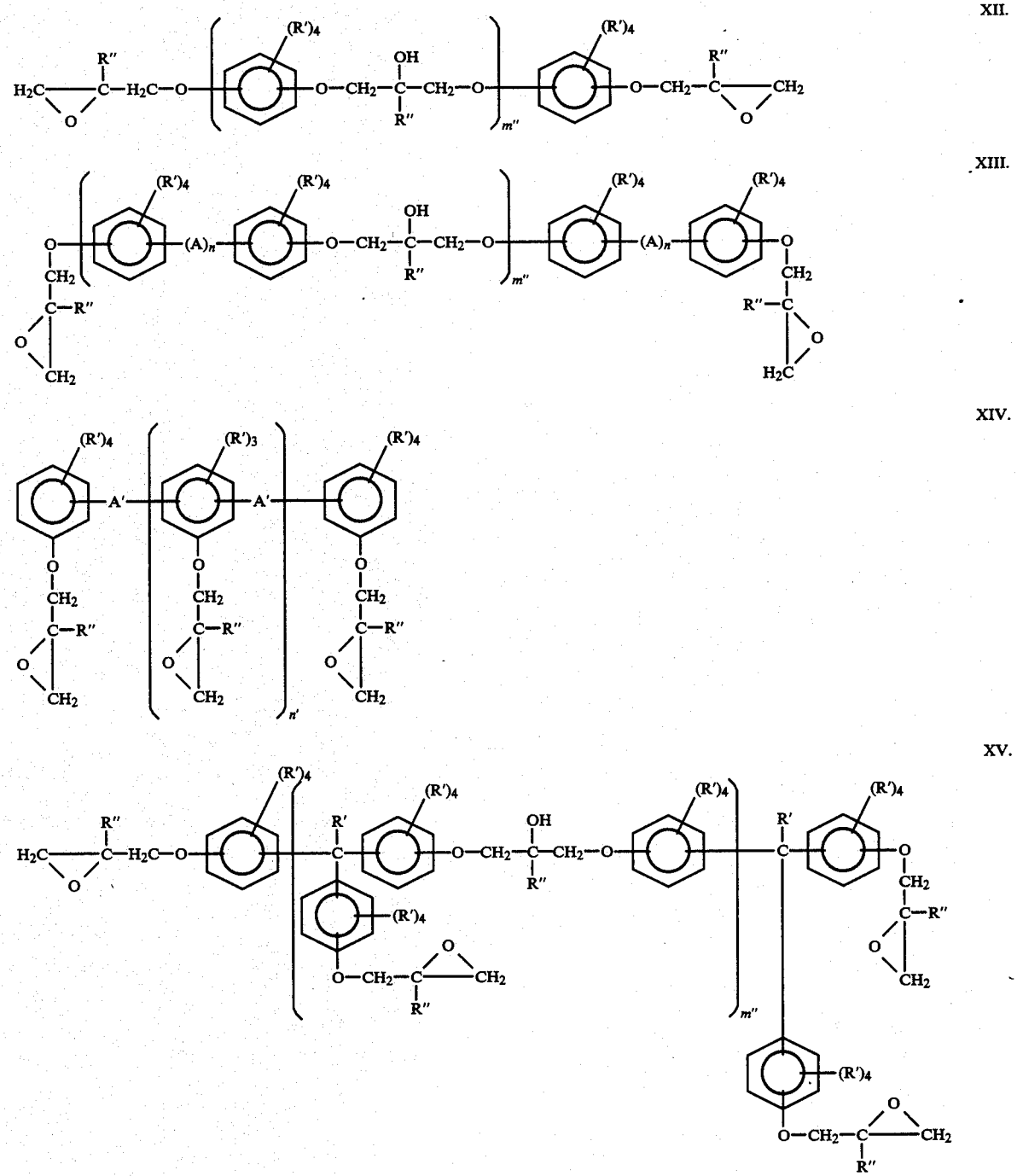

wherein A, A', R', n and n' are as herein before defined, each R'' is independently hydrogen or a hydrocarbyl group having from 1 to about 3 carbon atoms, and m'' tion times and temperatures vary depending on the composition of the epoxy resin reactant used; the amount and type of catalyst used, if any; the presence of inert solvent, if any. Typically, the advancement reaction when catalyzed is conducted at a temperature of from about 50° C. to about 150° C., preferably from about 90° C. to about 120° C. for from about 15 minutes (900 s) to about 240 minutes (14400 s), preferably from about 30 minutes (1800 s) to about 90 minutes (5400 s). Advancement reaction times and temperatures are generally longer and higher, respectively, for the non-catalyzed reaction.

Suitable catalysts for preparing epoxy resins and advanced epoxy resins are described in the *Handbook of Epoxy Resins* by Lee and Neville, McGraw-Hill (1967), as well as by Bender et al in U.S. Pat. No. 2,506,486 which are incorporated herein by reference.

Suitable monounsaturated monocarboxylic acids for reaction with the polyepoxides of the co-oligomerization product of a cyanate mixture and a polymaleimide include acrylic acid, methacrylic acid, cyanoacrylic acid, crotonic acid, α-phenylacrylic acid, methoxyacrylic acid, cinnamic acid and the like or mixtures thereof. Methacrylic acid is a most preferred monounsaturated monocarboxylic acid. A mole ratio of 0.9 to 1 monounsaturated monocarboxylic acid group per epoxide group is preferred with a ratio of 0.96 to 0.98 being most preferred. The reaction between the polyepoxide of the co-oligomerization product of a cyanate mixture and a polymaleimide with a monounsaturated monocarboxylic acid is typically performed in the presence of a catalyst. Suitable catalysts for use herein are well known in the prior art. A quantity of from about 0.01 to about 2 percent by weight has been found to be a particularly suitable quantity of catalyst. Aqueous chromium trichloride is a most preferred catalyst at concentrations of about 0.01 to 0.3 percent by weight of the polyepoxide employed.

A suitable process inhibitor is typically used in the reaction between the polyepoxide of the co-oligomerization product of a cyanate mixture and a polymaleimide with a monounsaturated monocarboxylic acid to prevent gelation (homopolymerization of the vinyl ester and/or copolymerization of the vinyl ester with unreacted monounsaturated monocarboxylic acid). Suitable inhibitors for use herein are well known in the prior art. Hydroquinone activated with air is a most preferred inhibitor at concentrations of from about 100 to about 500 ppm based on the weight of the polyepoxide and monounsaturated monocarboxylic acid used.

The reaction to produce the vinyl ester is usually conducted at a temperature of from about 50° C. to about 125° C., preferably from about 80° to about 120° C. for from about 120 minutes (7200 s) to about 720 minutes (43,200 s), preferably from about 240 minutes (14,400 s) to about 480 minutes (28,800 s). Although reaction times and reaction temperatures can vary substantially, most preferred vinyl ester compositions are obtained by reacting to a specific conversion, typically 1.5 to 0.25 percent carboxylic acid.

The vinyl ester is typically combined with one or more reactive diluents such as copolymerizable ethylenically unsaturated monomers.

A wide selection of polymerizable monomers containing a >C=CH$_2$ group is available from the many known classes of vinyl monomers. Representative species are the vinyl aromatic compounds which include such monomers as styrene, α-methylstyrene, vinyl toluenes, halogenated styrenes, t-butylstyrene, divinyl benzene and the like.

Other suitable monomers include the methyl, ethyl, isopropyl, octyl, etc., esters of acrylic or methacrylic acid, vinyl acetate, diallyl maleate, dimethallyl fumarate, acidic monomers such as acrylic acid, methacrylic acid, crotonic acid and amide monomers such as acrylamide, N-alkyl acrylamides and the like and mixtures thereof.

Preferred polymerizable monomers containing a >C=CH$_2$ group are styrene, vinyl toluene, ortho-, meta- and para-halostyrenes, vinyl naphthalenes, the various alpha-substituted styrenes, as well as the various di-, tri- and tetrahalo styrenes, and acrylic, methacrylic and crotonic acid esters which include both the saturated alcohol esters and the hydroxyalkyl esters.

The blended vinyl ester resin composition may consist of up to 99 percent by weight of polymerizable monomer containing the >C=CH$_2$ group with the balance of the combined weight consisting of said vinyl ester resin. Preferably, the resin composition consists of 30 to 70 percent by weight of said monomer and 70 to 30 percent by weight of said vinyl ester resin.

While it is preferred in many applications to blend the vinyl ester resin with a polymerizable monomer, the present invention is not limited thereto. The vinyl ester resin can be cured and polymerized in the absence of such a monomer and can be applied and utilized as solutions in a nonpolymerizable solvent, such as is practiced in certain coating operations.

According to the present invention, the curing of the resin compositions is effected by the application of heat and/or pressure in the presence of a free radical forming catalyst. Catalysts that may be used for the curing or polymerization are preferably the peroxide catalysts, such as benzoyl peroxide, lauroyl peroxide, azobisisobutyronitrile, t-butyl hydroperoxide, t-butylperbenzoate, methyl ethyl ketone peroxide, potassium persulfate and the like. The amount of the catalyst added will preferably vary from 1 to about 2 percent by weight of reactants. Temperatures employed may vary over a considerable range but usually are in the range of 20° to 250° C.

Additionally, more rapid curing of the thermosetting resin compositions may be accomplished by the addition of accelerating agents such as lead or cobalt naphthenate, N,N-dimethylaniline and the like, usually in concentrations ranging from about 0.01 to about 2 weight percent.

Preferred compositions of this invention also include blends of the vinyl ester resins of polyepoxides of the co-oligomerization product of a cyanate mixture and a polymaleimide and vinyl ester resins of the prior art, as well as the cured compositions prepared from said blends. The cured compositions of said vinyl ester resin blends possess improvements in one or more physical or mechanical properties such as tensile strength, flexural strength, percent elongation, flexural modulus, viscosity and the like.

The vinyl ester resins of this invention are useful to make laminates, castings, coatings, and the like. The laminates are made by mixing into the vinyl ester resin a known amount of a free radical forming catalyst and optionally, an accelerator and adding this mixture to a suitable woven or nonwoven fibrous reinforcement such as asbestos fibers, aramid fibers, boron fibers, glass and carbon hybrid fibers, carbon fibers, fibrous glass or inorganic fibers. The vinyl ester resin can be rolled, sprayed, or impregnated into the fibrous reinforcement such as fibrous glass. When fibrous glass is used, it can be in any form such as chopped strands, filaments, glass ribbons, glass yarns, or reinforcing mats.

The vinyl ester resin may be compounded with solvents, pigments, fire suppressants, low profile additives or other resinous products and cured to form useful coatings in a manner well known in the art.

The following examples are illustrative of the invention, but are not to be construed as to limiting the scope thereof in any manner.

EXAMPLE 1

A. Preparation of Diphenol Cyanate Mixture

Cyanogen bromide (1.10 moles, 116.52 grams) was added to a reactor containing a stirred solution of bisphenol A (2.00 moles, 456.6 grams) in acetone (1000 milliliters) cooled to $-5°$ C. under a nitrogen atmosphere. The stirred solution was allowed to equilibrate at $-5°$ C. Triethylamine (1.00 mole, 101.20 grams) was then added to the reactor over a 14 minute (840 s) period so as to maintain the reaction temperature at $-5°$ to $-2°$ C. After completion of the triethylamine addition, the reactor was maintained at $-5°$ to $-3°$ C. for an additional 30 minutes (1800 s), followed by addition of the reaction product to chilled water (1.5 gallons, 5.7 liters) with agitation. After 5 minutes (300 s), the water and product mixture was subjected to multiple extractions with three 500 milliliter portions of methylene chloride. The combined methylene chloride extracts were sequentially washed with two 750 milliliter portions of water and then dried over anhydrous sodium sulfate. The dry methylene chloride extract was filtered and solvent removed by rotary evaporation under vacuum. The diphenol cyanate mixture was recovered (464.4 grams) as a light yellow colored solid at room temperature (25° C.). Infrared spectrophotometric analysis demonstrated the presence of the cyanate groups as well as unreacted hydroxyl groups. Liquid chromatographic analysis demonstrated the presence of 56.88 area percent bisphenol A, 36.94 area percent bisphenol A monocyanate, and 6.18 area percent bisphenol A dicyanate.

B. Preparation of Bismaleimide of Methylenedianiline

A 106.0 gram portion of maleic anhydride (1.08 moles) and 400 milliliters of N,N-dimethylformamide were added to a reactor and maintained under a nitrogen atmosphere with stirring. The stirred solution was cooled to 5° C. then 107.0 grams of methylenedianiline (0.54 mole) dissolved in 200 milliliters of N,N-dimethylformamide was added to the reactor over a sixty minute (3600 s) period and so as to maintain the reaction temperature at 5° to 10° C. After completion of the methylenedianiline in N,N-dimethylformamide solution addition the reactor was maintained at 5° to 10° C. for an additional 120 minutes (7200 s). The reactor was then allowed to warm to room temperature (25° C.), and the reaction product was removed and rotary evaporated at 55° to 60° C. under vacuum. After approximately 300 milliliters of N,N-dimethylformamide and water had distilled off, a voluminous light yellow colored precipitate formed and was recovered by filtration. The recovered precipitate was recrystallized from acetone and then dried in a vacuum oven at 80° C. The bismaleimide of methylenedianiline (172.6 grams) was recovered in 89.2 percent yield as a light yellow colored powder. Infrared spectrophotometric analysis of a potassium chloride pellet of the product confirmed the product structure. Nuclear magnetic resonance spectroscopy provided further confirmation of the product structure.

C. Co-oligomerization of Diphenol Cyanate Mixture and Bismaleimide

A portion of the diphenol cyanate mixture (225.0 grams) from A above was added to a reactor and heated to 100° C. with stirring under a nitrogen atmosphere. A portion of the bismaleimide of methylenedianiline (6.53 grams) from B above was added to the stirred diphenol cyanate mixture. After five minutes (300 s) of mixing, 6.0 percent cobalt naphthenate (0.10 percent by weight, 0.233 gram) was added to the stirred diphenol cyanate and bismaleimide mixture. The reaction temperature was increased to 177° C. and maintained for 2.0 hours (7200 s). The hydroxyaromatic co-oligomerization product was recovered in quantitative yield as a light amber colored, brittle, transparent solid at room temperature (23° C.). Infrared spectrophotometric analysis of a film sample of the co-oligomerization product demonstrated complete disappearance of the cyanate functionality (2279 and 2238 cm$^{-1}$), appearance of aromatic ring carbon-nitrogen and carbon-carbon absorbances (1614, 1598, 1565 and 1507 cm$^{-1}$), appearance of maleimide carbonyl functionality (1696 cm$^{-1}$) and presence of hydroxyl functionality (3370 cm$^{-1}$).

D. Epoxidation of Diphenol Cyanate Mixture and Bismaleimide Co-oligomerization Product A portion (125.0 grams, 0.7786 hydroxyl equivalent) of the diphenol cyanate mixture and bismaleimide co-oligomerization product from C above, epichlorohydrin (3.89 moles, 360.23 grams), isopropanol (193.97 grams, 35 percent by weight of epichlorohydrin used) and water (31.32 grams, 8 percent by weight of epichlorohydrin used) were added to a reactor and stirred under a nitrogen atmosphere at 50° C. until a solution was formed. At that time, dropwise addition of a sodium hydroxide (1.402 moles, 56.06 grams) solution in water (224.24 grams) commenced and was completed over the next 45 minutes (2700 s). During this sodium hydroxide addition, the reaction temperature was allowed to increase to 60° C. and was then held at this temperature. Fifteen minutes (900 s) after the addition of sodium hydroxide solution, a second solution of sodium hydroxide (0.623 mole, 24.92 grams) in water (99.66 grams) was added dropwise to the reactor over the next 20 minutes (1200 s). Fifteen minutes (900 s) later, the reactor was cooled to 40° C., then an initial water wash (400 milliliters) was added to the reactor. An insoluble amber colored precipitate was removed by decantation of the reactor contents into a separatory funnel. The water wash layer was separated and discarded while the organic layer was added back into the separatory funnel along with a second water wash (600 milliliters). The organic layer was separated then added back into the separatory funnel along with a third water wash (800 milliliters) and additional epichlorohydrin (200 milliliters). The recovered organic layer was stripped of solvents by rotary evaporation at 100° C. for 60 minutes (3600 s) under vacuum. The epoxy resin was recovered (168.8 grams) as a transparent yellow colored liquid at room temperature (25° C.). Epoxide titration revealed the presence of 20.56 percent by weight epoxide which corresponds to an epoxide equivalent weight of 209.14. Infrared spectrophotometric analysis of a film sample of the epoxy resin demonstrated the presence of aromatic ring carbon-nitrogen and carbon-carbon absorbances (1606, 1581 and 1516 cm$^{-1}$), presence of minor hydroxyl absorbance (3476 cm$^{-1}$), presence of epoxide functionality (835 cm$^{-1}$), presence of maleimide carbonyl absorbance as a shoulder (1696 cm$^{-1}$) and presence of two minor absorbances at 1713 and 1762 cm$^{-1}$.

E. Methacrylation of Epoxy Resin of Diphenol Cyanate Mixture and Bismaleimide Co-oligomerization Product A portion (157.7 grams, 0.754 epoxide equivalent) of the epoxy resin of the diphenol cyanate mixture and bismaleimide co-oligomerization product from D above was added to a reactor, stirred and heated to 90° C. Hydroquinone (0.088 gram) then methacrylic acid (62.91 grams, 0.731 mole) were sequentially added then sparging with air (0.5 liter per minute) was started. After ten minutes (600 s) at the 90° C. reaction temperature, 33.33 percent aqueous chromium trichloride catalyst (0.197 gram) was added and the temperature controller was set at 110° C. and this temperature was achieved four minutes (240 s) later. After two minutes (120 s) at the 110° C. reaction temperature, the temperature controller was set at 115° C. and this temperature was achieved one minute (60 s) later. After 386 minutes (23,160 s) at the 115° C. reaction temperature, titration of a sample of the vinyl ester demonstrated the presence of 0.72 percent carboxylic acid and 0.79 percent epoxide. The reactor was cooled to 80° C. then phenothiazine (0.0433 gram) and styrene (121.69 grams) were sequentially added to the reactor. The vinyl ester resin was recovered (335 grams) as a transparent, light amber colored liquid.

F. Preparation of Cured Vinyl Ester Resin

A portion of the vinyl ester resin was used for Brookfield viscosity (25° C.) and SPI gel test (84° C., 1 percent by weight benzoyl peroxide) determinations. Clear, unfilled ⅛ inch (0.3175 cm) castings were prepared for heat distortion temperature (264 psi, 1820 kPa), tensile and flexural strength, flexural modulus, percent elongation and average Barcol hardness (934-1 scale) determinations. Each casting was cured at room temperature (25° C.) using a cure system of 1 percent by weight benzoyl peroxide and 0.05 percent by weight N,N-dimethylaniline. Twenty-four hours (86,400 s) after the cure exotherm had subsided, post curing for 2 hours (7200 s) at 100° C. was completed. Mechanical properties of tensile (8) and flexural (6) test pieces were determined using an Instron machine with standard test methods (ASTM D-638 and D-790). Heat distortion temperature of clear casting test pieces (2) was determined using an Aminco Plastic Deflection Tester (American Instrument Co.) with standard test methods (ASTM D-648 modified by use of ⅛ inch width castings). The results are given in Table I.

COMPARATIVE EXPERIMENT A

Triazine Functional Vinyl Ester Resin, Example 1 of U.S. Patent No. 4,515,934

1. Preparation of Diphenol Cyanate Mixture

Cyanogen bromide (0.825 mole, 87.39 grams) was added to a reactor containing a stirred solution of bisphenol A (1.5 moles, 342.45 grams) in acetone (950 milliliters) cooled to −5° C. under a nitrogen atmosphere. The stirred solution was allowed to equilibrate at −5° C., then triethylamine (0.75 mole, 75.9 grams) was added to the reactor over a 20 minute (1200 s) period and so as to maintain the reaction temperature at −1° to −5° C. After completion of the triethylamine addition, the reactor was maintained at −3° to 5° C. for an additional 30 minutes (1800 s), followed by addition of the reaction product to chilled water (1 gallon) with agitation. After 5 minutes (300 s), the water and product mixture was subjected to multiple extractions with three 400 milliliter portions of methylene chloride. The combined methylene chloride extracts were sequentially washed with 500 milliliters of dilute hydrochloric acid (5 percent), 1000 milliliters of water, and then dried over anhydrous sodium sulfate. The dry methylene chloride extract was filtered and solvent removed by rotary evaporation under vacuum. The diphenol cyanate mixture was recovered (337 grams) as a white-colored solid at room temperature (25° C.). Infrared spectrophotometric analysis demonstrates the presence of the cyanate groups as well as unreacted hydroxyl groups. Liquid chromatographic analysis demonstrated the presence of 59.53 area percent bisphenol A, 35.01 area percent bisphenol A monocyanate, and 5.46 area percent bisphenol A dicyanate.

2. Trimerization of Diphenol Cyanate Mixture

A portion of the diphenol cyanate mixture (335 grams) from 1 above and 6 percent cobalt naphthenate (0.1 percent by weight, 0.34 gram) were thoroughly mixed and placed in a glass tray. The tray was then placed in a forced-air, convection-type oven and maintained for 1.25 hour (4500 s) at 177° C. The hydroxyaromatic oligomers containing triazine groups were recovered in quantitative yield as a transparent, brittle solid at room temperature (25° C.). The oligomers had a greenish-colored cast due to the catalyst. At the 177° C. temperature, the oligomers were still totally fluid. Infrared spectrophotometric analysis demonstrated complete disappearance of the cyanate groups, appearance of the triazine functionality, and the presence of unreacted hydroxyl groups.

3. Epoxidation of Hydroxy Aromatic Oligomers Containing Triazine Groups

A portion (250 grams) of the hydroxyaromatic oligomers containing triazine groups from 2 above, epichlorohydrin (8.25 moles, 763.05 grams), isopropanol (35 percent by weight of epichlorohydrin used, 410.87 grams), and water (8 percent by weight of epichlorohydrin used, 66.35 grams) were added to a reactor and stirred under a nitrogen atmosphere at 60° C. until a solution was formed. At that time, the reactor was cooled to 50° C. and dropwise addition of a sodium hydroxide (2.97 moles, 118.75 grams) solution in water (475 grams) commenced and was completed over the next 30 minutes (1800 s). During this sodium hydroxide addition, the reaction temperature was allowed to increase to 60° C. and was then held at this temperature. Thirty minutes (1800 s) after the addition of sodium hydroxide solution, a second solution of sodium hydroxide (1.32 mole, 52.78 grams) in water (211.11 grams) was added dropwise to the reactor over the next 20 minutes (1200 s). Fifteen minutes (900 s) later, the reactor was cooled to 40° C. then an initial water wash (250 grams) was added to the reactor and the contents were transferred to a separatory funnel. The water wash layer was separated and discarded while the organic layer was added back into the separatory funnel along with a second water wash (250 grams). The water wash layer was separated and discarded while the organic layer was added back into the separatory funnel with a final water wash (800 grams). Epichlorohydrin (200 grams) was added to the separatory funnel, then the water wash layer was separated and discarded. The recovered organic layer was stripped of solvents by rotary evaporation at 100° C. for 90 minutes (5400 s) under vacuum. The epoxy resin was recovered (346.1 grams) as a transparent, light yellow-colored liquid at room temperature (25° C.). Infrared spectrophotometric analysis demonstrated substantially complete disappearance of hydroxyl groups, appearance of epoxide groups and presence of triazine groups. Epoxide titration revealed the presence of 22.23 percent by weight epoxide (193.43 EEW).

4. Methacrylation of Triazine Functional Epoxy Resin

A portion (300 grams) of the epoxy resin containing triazine groups from 3 above was added to a reactor and heated to 90° C. Hydroquinone (0.172 grams) then methacrylic acid (129.38 grams) were sequentially added then stirring and sparging with air (0.5 liter per minute) were started. After ten minutes (600 s) at the 90° C. reaction temperature, 33.33 percent aqueous chromium trichloride catalyst (0.375 gram) was added and the temperature controller was set at 110° C. and this temperature was achieved 15 minutes (900 s) later. After 26 minutes (1560 s) at the 110° C. reaction temperature, the temperature controller was set at 112° C. and this temperature was achieved six minutes (360 s) later. After four minutes (240 s) at the 112° C. reaction temperature, the temperature controller was set at 115° C. and this temperature was achieved five minutes (300 s) later. After 4 hours (14,400 s) at the 115° C. reaction temperature, the temperature controller was set at 117° C. and this temperature was achieved three minutes (180 s) later. After 117 minutes (7020) at the 117° C. reaction temperature, titration of a sample of the vinyl ester demonstrated the presence of 1.298 percent carboxylic acid. Infrared spectrophotometric analysis demonstrated substantially complete disappearance of epoxide groups, appearance of ester groups and presence of triazine groups. The reactor was cooled to 80° C. then phenothiazine (0.172 gram) and styrene (240.63 grams) were sequentially added to the reactor. The vinyl ester resin containing triazine groups (668 grams) was recovered as a transparent, light yellow-colored liquid. A portion of the vinyl ester resin was used for physical and mechanical property testing using the method of Example 1-F. The results are given in Table I.

COMPARATIVE EXPERIMENT B

Triazine and Oxazoline Functional Vinyl Ester, Example 4 of U.S. Pat. No. 4,515,934

1. Preparation of Diphenol Cyanate Mixture

Cyanogen bromide (1.1 moles, 116.52 grams) was added to a reactor containing a stirred solution of bisphenol A (2 moles, 456.60 grams) in acetone (1050 milliliters) cooled to −5° C. under a nitrogen atmosphere. The stirred solution was allowed to equilibrate at −5° C., then triethylamine (1 mole, 101.19 grams) was added to the reactor over an eighteen minute (1080 s) period and so as to maintain the reaction temperature at −5° to 0° C.. After completion of the triethylamine addition, the reactor was maintained at −2° to 5° C. for an additional 30 minutes (1800 s), followed by addition of the reaction product to chilled water (1.5 gallons) with agitation. After 5 minutes (300 s), the water and product mixture was subjected to multiple extraction with three 400 milliliter portions of methylene chloride. The combined methylene chloride extracts were sequentially washed with 500 milliliters of dilute hydrochloric acid (5 percent), 1000 milliliters of water and then dried over anhydrous sodium sulfate. The dry methylene chloride extract was filtered and solvent removed by rotary evaporation under vacuum. The diphenol cyanate mixture was recovered (398.03 grams) as a white-colored solid at room temperature (25° C.). Infrared spectrophotometric analysis demonstrated the presence of the cyanate groups as well as unreacted hydroxyl groups. Liquid chromatographic analysis demonstrated the presence of 57.11 area percent bisphenol A, 35.33 area percent bisphenol A monocyanate and 7.56 area percent bisphenol A dicyanate.

2. Co-oligomerization of Diphenol Cyanate Mixture and an Epoxy Resin

A portion (388.7 grams) of the diphenol cyanate mixture from 1 above, an epoxy resin (25.64 grams) and 6 percent cobalt naphthenate (0.1 percent by weight, 0.41 gram) were thoroughly mixed and placed in a glass tray. The epoxy resin had an epoxide equivalent weight (EEW) cf 340.4 and was prepared by reaction of a diglycidyl ether of bisphenol A (EEW =183) (0.8 equiv., 146.4 grams) with bisphenol A (0.4 equiv., 45.66 grams) and benzyltrimethylammonium chloride catalyst (60 percent aqueous) (0.19 gram) at 120° C. for 50 minutes. The tray was then placed in a forced-air, convection-type oven and maintained for 1.25 hours (4500 s) at 177° C. The hydroxyaromatic co-oligomerization product containing triazine and oxazoline groups was recovered in quantitative yield as a transparent, light amber-colored, brittle solid at room temperature (25° C.). Infrared spectrophotometric analysis demonstrated complete disappearance of the cyanate groups, appearance of triazine groups, appearance of oxazoline groups and the presence of unreacted hydroxyl groups.

3. Epoxidation of Hydroxyaromatic Co-oligomerization Product Containing Triazine and Oxazoline Groups A portion (225 grams) of the hydroxyaromatic co-oligomerization product contaning triazine and oxazoline groups from 2 above epichlorohydrin (7.198 moles, 665.99 grams), isopropanol (35 percent by weight of epichlorohydrin used, 358.61 grams), and water (8 percent by weight of epichlorohydrin used, 57.91 grams) were added to a reactor and stirred under a nitrogen atmosphere at 50° C. until a solution was formed. At that time, dropwise addition of a sodium hydroxide (2.59 moles, 103.64 grams) solution in water (414.58 grams) commenced and was completed over the next 30 minutes (1800 s). During this sodium hydroxide addition, the reaction temperature was allowed to increase to 60° C. and was then held at this temperature. Thirty minutes (1800 s) after the addition of sodium hydroxide solution, a second solution of sodium hydroxide (1.15 moles, 46.06 grams) in water (184.26 grams) was added dropwise to the reactor over the next 20 minutes (1200 s). Fifteen minutes (900 s) later, the reactor was cooled to 40° C., then an initial water wash (250 grams) was added to the reactor and the contents were transferred to a separatory funnel. The water wash layer was separated and discarded while the organic layer was added back into the separatory funnel along with a second water wash (250 grams). The water wash layer was separated and discarded while the organic layer was added back into the separatory funnel with a final water wash (800 grams). Epichlorohydrin (200 grams) was added to the separatory funnel, then the water wash layer was separated and discarded. The recovered organic layer was stripped of solvents by rotary evaporation at 100° C. for 90 minutes (5400 s) under vacuum. The epoxy resin was recovered (306.34 grams) as a transparent, light yellow-colored liquid at room temperature (25° C.). Infrared spectrophotometric analysis demonstrated substantially complete disappearance of hydroxyl groups, appearance of epoxide groups and presence of both triazine and oxazoline groups. Epoxide titration revealed the presence of 19.26 percent by weight epoxide (223.26 EEW).

4. Methacrylation of Hydroxyaromatic Co-oligomerization Product Containing Triazine and Oxazoline Groups A portion (282 grams) of the epoxy resin containing triazine and oxazoline groups from 3 above was added to a reactor and heated to 90° C. Hydroquinone (0.155 grams) then methacrylic acid (105.37 grams) were sequentially added then stirring and sparging with air (0.5 liter per minute) were started. After eleven minutes (660 s) at the 90° C. reaction temperature, 33.33 percent aqueous chromium trichloride catalyst (0.353 gram) was added and the temperature controller was set at 110° C. and this temperature was achieved 8 minutes (480 s) later. After 26 minutes (1560 s) at the 110° C. reaction temperature, the temperature controller was set at 112° C. and this temperature was achieved 2 minutes (120 s) later. After 4 minutes (240 s) at the 112° C. reaction temperature, the temperature controller was set at 115° C. and this temperature was achieved 4 minutes (240 s) later. After 250 minutes (15,000 s) at the 115° C. reaction temperature, titration of a sample of the vinyl ester demonstrated the presence of 0.42 percent carboxylic acid. Infrared spectrophotometric analysis demonstrated substantially complete disappearance of epoxide groups, appearance of ester groups and presence of both triazine and oxazoline groups. The reactor was cooled to 80° C. then phenothiazine (0.155 grams) and styrene (217.25 grams) were sequentially added to the reactor. The vinyl ester resin containing triazine and oxazoline groups (603.2 grams) was recovered as a transparent, light yellow-colored liquid. A portion of the vinyl ester resin was used for physical and mechanical property testing using the method of Example 1-F. The results are given in Table I.

COMPARATIVE EXPERIMENT C

Vinyl Ester Resin of Polyepoxide Containing Triazine Groups and Iminocarbamate Linkages, Example 1 of U.S. Pat. No. 4,555,554

1. Preparation of Diphenol Cyanate Mixture

Cyanogen bromide (1.65 moles, 174.79 grams) was added to a reactor containing a stirred solution of bisphenol A (3.00 moles, 684.9 grams) in acetone (1200 milliliters) cooled to −5° C. under a nitrogen atmosphere. The stirred solution was allowed to equilibrate at −5° C. Triethylamine (1.50 moles, 151.80 grams) was then added to the reactor over a 24 minute (1440 s) period so as to maintain the reaction temperature at −5° to −2° C. After completion of the triethylamine addition, the reactor was maintained at −5° to −2° C. for an additional 30 minutes (1800 s), followed by addition of the reaction product to chilled water (1.5 gallons, 5.7 liters) with agitation. After 5 minutes (300 s), the water and product mixture was subjected to multiple extractions with three 500 milliliter portions of methylene chloride. The combined methylene chloride extracts were sequentially washed with 500 milliliters of dilute 1% aqueous hydrochloric acid, 800 milliliters of water and then dried over anhydrous sodium sulfate. The dry methylene chloride extract was filtered and solvent removed by rotary evaporation under vacuum. The diphenol cyanate mixture was recovered (705.0 grams) as a light yellow-colored solid at room temperature (25° C.). Infrared spectrophotometric analysis demonstrated the presence of the cyanate groups as well as unreacted hydroxyl groups. Liquid chromatographic analysis demonstrated the presence of 56.24 area percent bisphenol A, 38.55 area percent bisphenol A monocyanate, and 5.21 area percent bisphenol A dicyanate.

2. Co-oligomerization of Diphenol Cyanate Mixture and an Aromatic Diamine

A portion (500.0 grams) of the diphenol cyanate mixture from 1 above, 4,4′-diaminodiphenyl methane (9.40 grams) and methylene chloride solvent (400.0 grams) were mixed on a shaker until a homogeneous mixture was obtained. The mixture was thoroughly blended with 6.0 percent cobalt naphthenate (0.10 percent by weight, 0.51 gram) then placed in a glass tray. The tray was then placed in a vacuum oven and methylene chloride solvent devolatilized from the mixture. The devolatilized mixture was then placed in a forced-air, convection-type oven and maintained for 2.0 hours (7200 s) at 177° C. The hydroxyaromatic co-oligomerization product containing triazine groups and iminocarbamate linkages was recovered in quantitative yield as a transparent, light yellow-colored, brittle solid at room temperature (25° C.). Infrared spectrophotometric analysis demonstrated complete disappearance of the cyanate functionality, appearance of the triazine functionality, appearance of iminocarbamate functionality and the presence of unreacted hydroxyl functionality.

3. Epoxidation of Hydroxyaromatic Co-oligomerization Product Containing Triazine Groups and Iminocarbamate Linkages A portion (200 grams) of the hydroxyaromatic co-oligomerization product from 2 above, epichlorohydrin (6.4488 moles, 596.71 grams), isopropanol (35 percent by weight of epichlorohydrin used, 321.31 grams), and water (8 percent by weight of epichlorohydrin used, 51.89 grams) were added to a reactor and stirred under a nitrogen atmosphere at 50° C until a solution was formed. At that time, dropwise addition of a sodium hydroxide (2.322 moles, 92.86 grams) solution in water (371.44 grams) commenced and was completed over the next 45 minutes (2700 s). During this sodium hydroxide addition, the reaction temperature was allowed to increase to 60° C. and was then held at this temperature. Fifteen minutes (900 s) after the addition of sodium hydroxide solution, a second solution of sodium hydroxide (1.032 mole, 41.27 grams) in water (165.09 grams) was added dropwise to the reactor over the next 20 minutes (1200 s). Fifteen minutes (900 s) later, the reactor was cooled to 40° C., then an initial water wash (400 milliliters) was added to the reactor. The reactor contents were transferred to a separatory funnel. The water wash layer was separated and discarded while the organic layer was added back into the separatory funnel along with a second water wash (600 milliliters). The organic layer was separated then added back into the separatory funnel along with a third water wash (800 milliliters) and additional epichlorohydrin (200 milliliters). The recovered organic layer was stripped of solvents by rotary evaporation at 110° C. for 60 minutes (3600 s) under vacuum. The epoxy resin was recovered (271.60 grams) as a transparent, light yellow-colored liquid at room temperature (25° C.). Epoxide titration revealed the presence of 20.65 percent by weight epoxide.

4. Methacrylation of Polyepoxide of Hydroxyaromatic Oligomers Containing Triazine Groups and Iminocarbamate Linkages A portion (186.0 grams) of the epoxy resin from 3 above was added to a reactor and heated to 90° C. Hydroquinone (0.104 grams) was added then stirring and sparging with air (0.5 liter per minute) were started. Three minutes (180 s) later, methacrylic acid (74.51 grams) was added. After seven minutes (420 s), the rection temperature stabilized at 90° C. then 33.33 percent aqueous chromium trichloride catalyst (0.233 gram) was added and the temperature controller was set at 110° C. and this temperature was achieved three minutes (180 s) later. After four minutes (240 s) at the 110° C. reaction temperature, the temperature controller was set at 115° C. and this temperature was achieved two minutes (120 s) later. After 233 minutes (13,980 s) at the 115° C. reaction temperature, titration of a pair of samples of the vinyl ester demonstrated the presence of 0.69 percent carboxylic acid and 1.00 percent epoxide. The reactor was cooled to 80° C. then phenothiazine (0.052 grams) and styrene (145.34 grams) were sequentially added to the reactor. The vinyl ester resin of the polyepoxide of hydroxyaromatic oligomers containing triazine groups and iminocarbamate linkages was recovered as a transparent, light amber-colored liquid. A portion of the vinyl ester resin was used for physical and mechanical property testing using the method of Example 1-F. The results are given in Table 1.

B. Methacrylation of Advanced Epoxy Resin of Diphenol Cyanate Mixture and Bismaleimide Co-oligomerization Product with a Diglycidyl Ether of Bisphenol A A portion (200.0 grams) of the advanced epoxy resin of the diphenol cyanate mixture and bismaleimide co-oligomerization product with a diglycidyl ether of bisphenol A from A above was added to a reactor and heated to 90° C. Hydroquinone (0.105 gram) then methacrylic acid (62.20 grams) were sequentially added then stirring and sparging with air (0.5 liter per minute) were started. After nine minutes (540 s) at the 90° C. reaction temperature, 33.33 percent aqueous chromium trichloride catalyst (0.250 gram) was added and the temperature controller was set at 110° C. and this temperature was achieved five minutes (300 s) later. After two minutes (120 s) at the 110° C. reaction temperature, the temperature controller was set at 115° C. and this temperature was achieved one minute (60 s) later. After 263 minutes (15,780 s) at the 115° C. reaction temperature, titration of a sample of the vinyl ester demonstrated the presence of 0.32 percent carboxylic acid and 0.41 percent epoxide. The reactor was cooled to 80° C., then phenothiazine (0.052 gram) and styrene (173.44 grams) were sequentially added to the reactor. The vinly ester resin was recovered as a transparent, light amber-colored liquid. A portion of the vinyl ester resin was used for physical and mechanical property testing using the method of Example 1-F. The results are given in Table II.

TABLE I

|  | Example 1-F | Comp. Expt. A-4 | Comp. Expt. B-4 | Comp. Expt. C-4 |
| --- | --- | --- | --- | --- |
| Brookfield Viscosity (cp) | 189 | 151 | 190 | 553 |
| SPI Gel Test[1] | | | | |
| gel time, min./sec. | 2.5/150 | 15.65/939 | 15.4/924 | 1.0/60 |
| cure time, min./sec. | 4.4/264 | 20/1200 | 20.8/1248 | 2.3/138 |
| maximum exotherm, °F./°C. | 392/200 | 372/189 | 358/181 | 366/186 |
| Barcol Hardness | 47 | 41 | 38 | 45 |
| Heat Distortion Temperature, °F./°C. | 248/120.3 | 221.9/105.5 | 213.4/100.8 | 228.2/109 |
| Tensile Strength × $10^{-3}$, psi/kPa | 14.6/100.7 | 9.3/64.1 | 11.5/79.3 | 13.9/95.9 |
| Elongation, % | 5.1 | 2.2 | 3.0 | 4.2 |
| Flexural Strength × $10^{-3}$, psi/kPa | 26.5/182.7 | 21.7/149.6 | 23.0/158.6 | 22.8/157.2 |
| Flexural Modulus × $10^{-5}$, psi/kPa | 6.06/41.78 | 5.77/39.78 | 5.45/37.58 | 5.82/40.1 |

[1] Comparative Experiment C-4 and Example 1-F resins contained 200 ppm phenothiazine while Comparative Experiment A-4 and B-4 resins contained 400 ppm phenothiazine.

EXAMPLE 2

A. Epoxy Resin Advancement with Diphenol Cyanate Mixture and Bismaleimide Co-oligomerization Product A portion (59.61 grams) of a diphenol cyanate mixture and bismaleimide co-oligomerization product prepared using the method of Example 1-C., a diglycidyl ether of bisphenol A (400.0 grams, 2.228 epoxide equivalents) having an epoxide equivalent weight (EEW) of 179.54 and 60 percent aqueous benzyltrimethylammonium chloride (0.4596 gram) were added to a reactor and heated to 120° C. After 1 hour (3600 s) of reaction at the 120° C. temperature, the advanced epoxy resin was recovered as an amber-colored, transparent liquid. Epoxide titration revealed the resin to contain 16.03 percent epoxide.

TABLE II

| Brookfield Viscosity (cp) | 200 |
| --- | --- |
| SPI Gel Test | |
| gel time, min./sec. | 4.9/294 |
| cure time, min./sec. | 6.9/414 |
| maximum exotherm, °F./°C. | 397/202.8 |
| Barcol Hardness | 44 |
| Heat Distortion Temperature, °F./°C. | 237/113.8 |
| Tensile Strength × $10^{-3}$, psi/kPa | 13.1/90.3 |
| Elongation, % | 6.3 |
| Flexural Strength × $10^{-3}$, psi/kPa | 24.7/170.3 |
| Flexural Modulus × $10^{-5}$, psi/kPa | 5.55/38.27 |

I claim:

1. A vinyl ester resin composition prepared by reacting
   (A) at least one polyepoxide of a co-oligomerization product of a mixed cyanate of a polyphenol and a polymaleimide; with (B) from about 0.75 to about 1.2 moles of at least one monounsaturated monocarboxylic acid; in the presence of (C) a catalytic quantity of a suitable catalyst for effecting a reaction between components (A) and (B).

2. A vinyl ester resin composition of claim 1 wherein component (B) is present in an amount of from about 0.9 to about 1 mole per epoxide group contained in component (A).

3. A vinyl ester resin of claim 2 wherein component (A) is (1) the polyepoxide resulting from epoxidation of the co-oligomerization product of a mixed cyanate of a polyphenol and a polymaleimide, (2) the polyepoxide resulting from advancing a polyepoxide or mixture of polyepoxides with the co-oligomerization product of a mixed cyanate of a polyphenol and a polymaleimide or a mixture of (1) and (2).

4. A vinyl ester resin of claim 3 wherein in component (A), the polyphenol is a bisphenol and the polymaleimide is a bismaleimide prepared from maleic anhydride and an aromatic diamine.

5. A vinyl ester resin of claim 4 wherein (a) in component (A), the polyphenol is bisphenol A and the polymaleimide is a bismaleimide prepared from maleic anhydride and methylenedianiline and (b) component (B) is methacrylic acid.

6. A composition which comprises (A) from about 1 to about 99 percent by weight of at least one vinyl ester resin prepared by reacting (1) at least one polyepoxide of a co-oligomerization product of a mixed cyanate of a polyphenol and a polymaleimide with (2) from about 0.75 to about 1.2 moles of at least one monounsaturated monocarboxylic acid per epoxide group contained in component (A-1); in the presence of (3) a catalytic quantity of a suitable catalyst for effecting a reaction between components (A-1) and (A-2); and (B) from about 99 to about 1 percent by weight of at least one ethylenically unsaturated monomer which is copolymerizable with component (A).

7. A composition of claim 6 wherein component (A) is present in an amount of from about 30 to about 70 percent by weight; component (B) is present in an amount of from about 70 to about 30 percent by weight and components (A-1) and (A-2) are present in an amount which provides from about 0.9 to about 1 mole of acid per epoxide group.

8. A composition of claim 7 wherein component (A-1) is (a) the polyepoxide resulting from epoxidation of the co-oligomerization product of a mixed cyanate of a polyphenol and a polymaleimide, (b) the polyepoxide resulting from advancing a polyepoxide or mixture of polyepoxides with the co-oligomerization product of a mixed cyanate of a polyphenol and a polymaleimide or (c) a mixture of (a) and (b).

9. A composition of claim 8 wherein (a) in component (A-1), the polyphenol is a bisphenol and the polymaleimide is a bismaleimide prepared from maleic anhydride and an aromatic diamine and (b) component (B) is an ethylenically unsaturated aromatic hydrocarbon or an ester of a monounsaturated monocarboxylic acid.

10. A composition of claim 9 wherein (a) in component (A-1), the polyphenol is bisphenol A and the polymaleimide is a bismaleimide prepared from maleic anhydride and methylenedianiline, (b) component (A-2) is methacrylic acid and component (B) is styrene.

11. A product resulting from curing a vinyl ester resin or composition of claims 1, 2, 3, 4, 5, 6, 7, 8, 9, or 10 with a curing quantity of a suitable curing agent therefor in the absence or presence of an effective quantity of a suitable curing accelerator therefor.

12. A product of claim 11 wherein said curing agent is one or more organic peroxide compounds and any such curing accelerator is an aromatic amine or a metal carboxylate.

13. A product of claim 12 wherein said curing agent is benzoyl peroxide, methyl ethyl ketone peroxide, or a combination thereof; and said curing accelerator is cobalt naphthenate, N,N-dimethylaniline, or a combination thereof.

* * * * *